United States Patent [19]

Moss

[11] Patent Number: 5,025,616
[45] Date of Patent: Jun. 25, 1991

[54] HAYRAKE HITCH AND METHOD OF USE

[76] Inventor: Floyd Moss, 4339 Old Hillsboro Rd., Franklin, Tenn. 37064

[21] Appl. No.: 430,523

[22] Filed: Nov. 1, 1989

[51] Int. Cl.$^5$ .......................... A01D 7/00; A01D 67/00
[52] U.S. Cl. ........................................ 56/14.9; 56/15.1;
56/384; 111/57; 172/57; 172/58
[58] Field of Search ............... 56/14.9, 15.1, 15.5,
56/6, 365, 378, 380, 384; 111/57, 58; 172/311, 313, 677

[56] References Cited

U.S. PATENT DOCUMENTS

| | | | |
|---|---|---|---|
| 2,597,828 | 5/1952 | Spurlin | 56/DIG. 14 X |
| 2,606,417 | 8/1952 | Richey | 56/10.7 |
| 3,177,828 | 4/1965 | Cramer | 172/677 X |
| 3,292,948 | 12/1966 | McMasters et al. | 172/311 X |
| 4,344,639 | 8/1982 | Pollard | 56/6 |
| 4,445,706 | 5/1984 | Jarosek | 111/57 X |
| 4,478,032 | 10/1984 | Inskeep | 56/14.9 X |
| 4,577,881 | 3/1986 | Gerger | 172/311 X |

Primary Examiner—George A. Suchfield
Attorney, Agent, or Firm—Eckert Seamans Cherin & Mellott

[57] ABSTRACT

A second hayrake hitch for use with a tractor is disclosed. The hayrake hitch includes a generally U-shaped main frame of size and height to overfit a forward hayrake which is directly connected to the tractor. The main frame includes a main beam and a wheeled rear support bar which is pivotally interconnected relative to the main beam. A second hayrake is connected to a hitch bar secured to the rear support bar to enable the tractor to simultaneously pull the two hayrakes. A hydraulic cylinder extends between the rear support bar and a leg connected to the main beam and hydraulic lines interconnect the cylinder with the hydraulic coupling of the tractor. By hydraulically functioning the cylinder while the tractor is moving, the rear support bar can be pivoted relative to the axis of the main beam to thereby move the rear hayrake to the right or to the left relative to the front hayrake to simultaneously rake two hay windrows or one large combined windrow.

17 Claims, 3 Drawing Sheets

HAYRAKE HITCH AND METHOD OF USE

BACKGROUND OF THE INVENTION

1. Field of the Invention

This invention relates generally to the field of farm equipment, and particularly, is directed to a novel second hitch for use with a tractor to enable an operator to pull two rakes in a manner to simultaneously rake two independent windrows of hay.

2. Description of the Prior Art

It is the usual practice to rake fresh mowed hay into individual, longitudinally extending, laterally spaced windrows wherein the hay will remain for an extended length of time as necessary for initial drying. After such initial drying, the individual windrows are mechanically raked, usually by employing tractor pulled hayrakes. In some instances, the individual windrows are mechanically raked after drying and can be bailed by utilizing presently available equipment. In other operations, laterally spaced individual windrows are mechanically raked on the ground laterally toward each other and then combined into a composite, longitudinally extending, double-sized, central windrow. The individual or paired windrows can then be loaded by a hay loader or picked up with a sweep rake or a pick-up bailing press, a combine or the like for further treatment.

In U.S. Pat. No. 3,714,766 to Ender, et al, there is disclosed a machine for combining hay windrows wherein a low level frame is provided to move a pair of laterally spaced conveyors as the frame is pulled in a field between pairs of longitudinally extending, laterally spaced windrows. The conveyors are operative to sweep the spaced windrows upwardly upon the conveyor and then to move the material rearwardly to converge at the respective conveyor rear ends. This results in the formation of longitudinally extending, double-sized, central windrows.

In U.S. Pat. No. 2,511,841 to Gaterman, there is disclosed an intermittingly operable windrow placing mechanism which functions as an auxiliary to any conventional windrowing device or attachment whereby paired windrows can be readily produced.

In U.S. Pat. No. 2,606,417, Richey discloses a reversible farm implement that is particularly adaptable for coupling to a tractor. A generally U-shaped main bar is constructed of suitable size and configuration to extend either forwardly or rearwardly of the tractor. The main frame is equipped with suitable hydraulic system elements which can be controlled by the driver to function the apparatus.

While the above described devices can be utilized in connection with hay windrows, and some of the devices can be employed to form longitudinally extending, double-sized windrows, none of the prior art devices, so far as is known to the present applicant, is capable of employing a pair of existing hayrakes simultaneously and in combination wherein the existing equipment can be utilized in connection with a single tractor a much more efficient and cost effective manner.

SUMMARY OF THE INVENTION

The present invention relates generally to the field of windrowing devices, and more particularly, is directed to a novel hayrake hitch suitable to permit a second hayrake to be pulled by a tractor and to be individually controlled an the operator to function in conjunction with or simultaneously with a first hayrake.

The second hayrake hitch of the present invention comprises generally a tractor drawn arched, main frame of height suitable to pass over and clear a conventional hayrake which is simultaneously being drawn by the same tractor without contact or other interference. The main frame or gooseneck extension hitch comprises generally a main structural beam of suitable length to overlie and extend beyond a first hayrake when the first hayrake is conventionally secured to the drawbar of a farm tractor. A front frame leg depends from the first or forward end of the main beam and terminates downwardly in a conventional socket or cup for pivotal interconnection with a ball connector which can be affixed to the tractor drawbar in the usual manner.

A rear frame leg depends from the second or rearward end of the main beam and downwardly pivotally connects to a rear, transverse, support bar, which bar endwardly carries axle supported wheels. The wheels are laterally spaced apart sufficiently to straddle the mower swath and to prevent the shattering of drying hay.

A top steering plate pivotally secures to the main frame rear leg and is linked to the rear support bar through an angularly offset, double acting, hydraulic cylinder. By providing suitable hydraulic tubing and controls, the function of the hydraulic cylinder can be readily regulated in the cab by the tractor operator to thereby cause pivotal movement of the second hayrake hitch wheels relative to the tractor. It is a design feature of the second hayrake hitch that the wheels can be pivoted through an arc of 70 degrees, that is either 35 degrees to the right of the main frame axis or 35 degrees to the left of the main frame axis.

In a preferred embodiment, a mechanical steering arm is provided intermediate the rear support bar and the top plate both to provide a positive steering restraint when the device is being transported, for example, over roads, and also to act as a means to render the second hayrake hitch equally adaptable for use with tractors of the type that do not include hydraulic couplings.

A drawbar of conventional configuration is welded or otherwise securely affixed to the rear support bar to permit a second hayrake to be conventionally connected to the second hayrake hitch. Accordingly, a first hayrake can be conventionally hitched in the regular position on the tractor drawbar and a second hayrake can be conventionally hitched to the second hayrake hitch drawbar wherein the first and second hayrakes can be operated simultaneously and cooperatively.

The first hayrake will follow the tractor at the said tractor drawbar and the second hayrake can be laterally offset by the operator either to the right or to the left. Upon function of the hydraulic cylinder, pivotal movement of the second hayrake hitch wheels to the right will cause the second hayrake to rake a separate windrow to the right of the windrow being raked by the first or tractor connected hayrake. Pivotal movement of the second hayrake hitch wheels to the left can cause the second hayrake to combine with the first hayrake to form one large windrow.

When the apparatus is intended to be moved from one location to another, the hydraulic cylinder can be activated to transversely align the rear support bar at right angles to the axis of the main frame so that the entire assembly can be centered for transportation purposes. A safety pin can be employed in connection with the mechanical steering device to prevent accidental right or left movement of the second hayrake during transportation.

It is therefore an object of the present invention to provide an improved second hayrake hitch of the type set forth.

It is another object of the present invention to provide a novel second hayrake hitch comprising a main frame or gooseneck extension of suitable height and length to overfit a first hayrake that is conventionally affixed to a tractor drawbar and which further comprises second, rearward drawbar which is affixed to a wheeled, pivotally connected support bar to provide a connection for a second, rearwardly positioned hayrake.

It is another object of the present invention to provide a novel second hayrake hitch which includes in combination a rigid, elongate gooseneck having a tractor drawbar connector at the forward end, the gooseneck terminating rearwardly in a pivotally connected rear support bar, left and right wheels supporting the rear support bar, hydraulic coupling means intermediate the rear support bar and the gooseneck extension hitch to pivot the rear support bar relative to the gooseneck extension hitch and a mechanical steering means coupling the rear support bar and the gooseneck extension hitch both to permit mechanical angular adjustment of the rear support bar relative to the gooseneck extension hitch and to provide a safety restraint during road transportation.

It is another object of the present invention to provide a novel hayrake hitch comprising an arched main frame means of height and length suitable to overfit a first hayrake, the main frame means terminating rearwardly in a pivotal connection to a transverse rear support bar means, first and second wheels rotatively carrying the rear support bar means, hydraulic cylinder means coupling the rear support bar means to the main frame means, the hydraulic cylinder means being remotely operated to pivot the rear support bar means relative to the main frame means and a second, rearward drawbar affixed to the rear support bar means to provide a point of connection for a second, rearward hayrake.

It is another object of the present invention to provide a novel second hayrake hitch that is simple in design, rugged in construction and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figure 1:
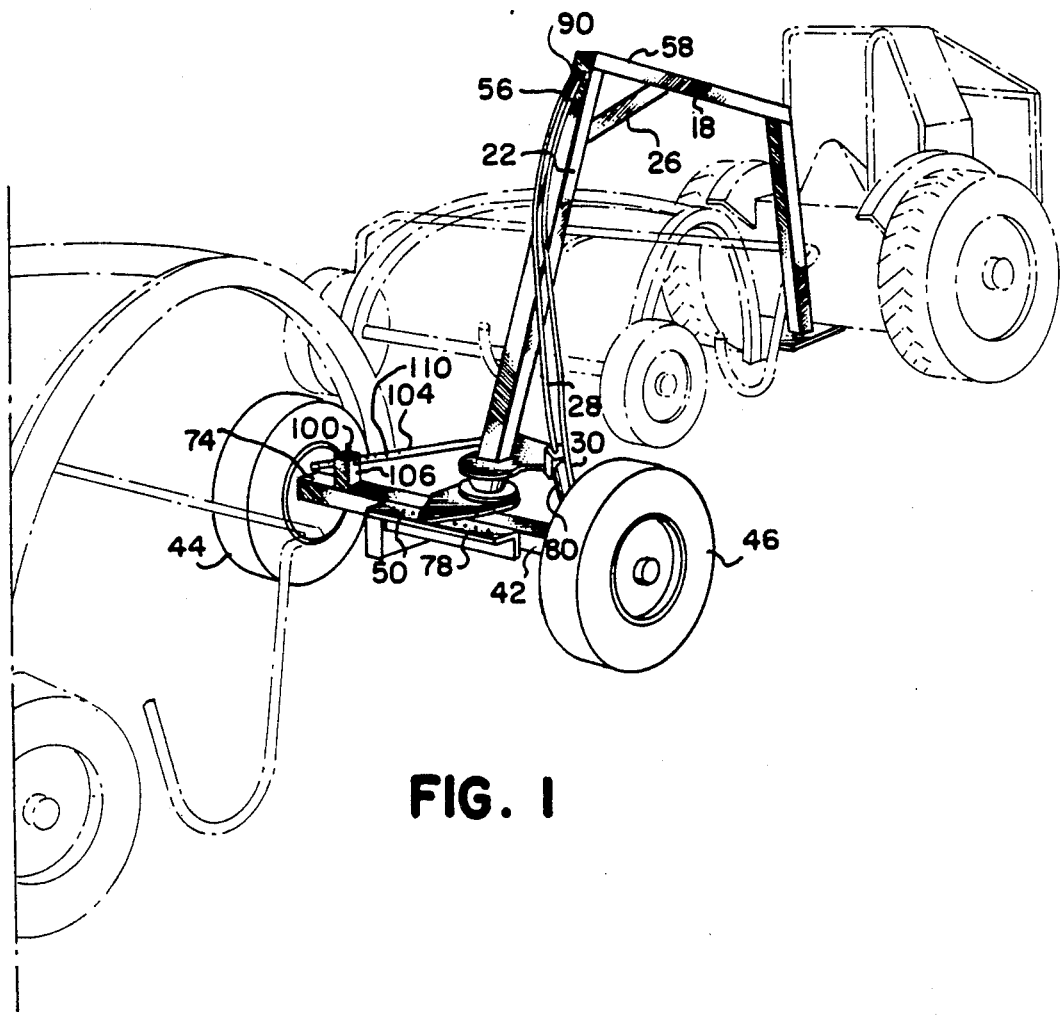
FIG. 1 is a perspective view of a second hayrake hitch constructed in accordance with the teachings of the present invention and showing the position of two hayrakes in phantom lines for purposes of association.

Although specific terms are used in the following description for the sake of clarity, these terms are intended to refer only to the particular structure of the invention selected for illustration in the drawings, and are not intended to define or limit the scope of the invention.

Figure 2:
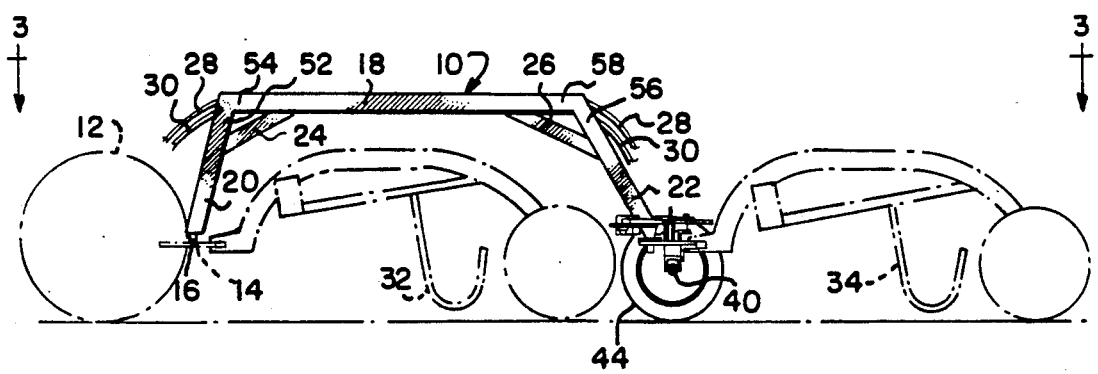
FIG. 2 is side elevation view of the second hayride hitch illustrated in FIG. 1.

Referring now to the drawings, there is shown in FIGS. 1 and 2 a generally U-shaped main frame or gooseneck extension hitch 10 which comprises a main beam 18 of suitable length and structural stability to span the length of a connected first or lead hayrake 32. The first hayrake 32 is of conventional design well known to those skilled in the art and is secured to the drawbar 14 of a farm tractor 12 of any suitable manufacture in the usual manner. The main frame 10 is particularly designed to be adaptable for use with the tractor drawbar 14 in a manner so as not to interfere at all with the usual interconnection between the existing drawbar 14 and the first or lead hayrake 32. In the present embodiment, the drawbar should be modified or altered as necessary to provide suitable ball to form part of a ball and socket connection 16 as hereinafter more fully set forth.

A front frame leg 20 has its upper end 52 permanently, securely affixed to the leading end 54 of the main beam 18 by welding or other known, suitable metal fabricating technique. If necessary, a strengthening gusset 24 can be affixed between the main beam 18 and the front frame leg 20. The front frame leg 20 terminates downwardly in a cup or socket to form the other part of the ball and socket connection 16 in cooperation with the ball portion which is secured upon the tractor drawbar 14. Accordingly, a pivotal interconnection between the tractor 12 and the gooseneck extension hitch 10 can be readily provided in known manner to facilitate easy drawing and remote operation of the device when in use.

A rear frame leg 22 has its upper end 56 welded or otherwise securely affixed to the rearward end 58 of the main beam 18 in a similar, known type of interconnection. If necessary or desirable, a strengthening gusset 26 can be interposed between the rearward portion of the main beam 18 and the upper portion of the rear frame leg 22, as illustrated.

Figure 4:
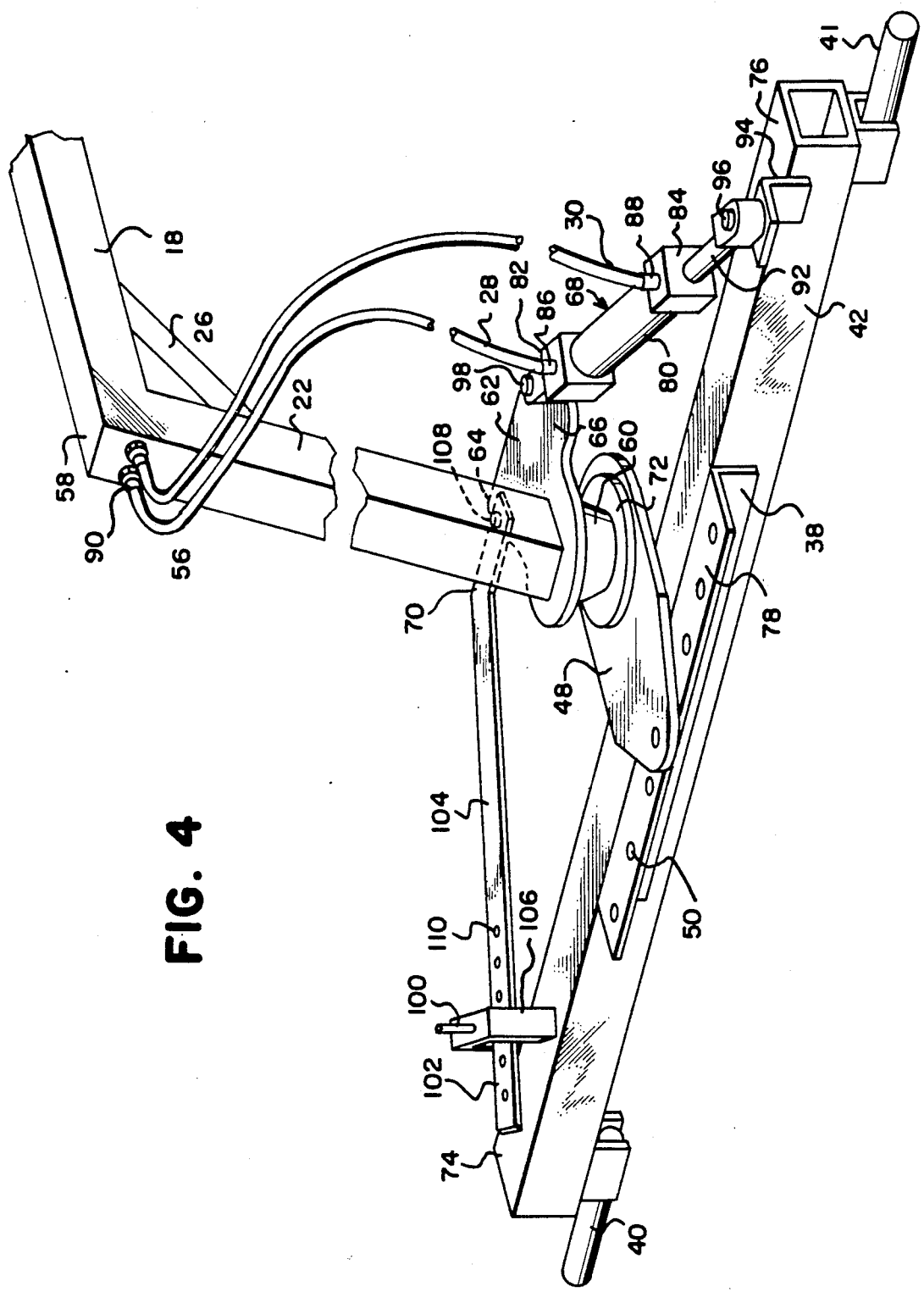
FIG. 4 is an enlarged, perspective, partial view showing the steering an locking construction features.

The rear frame leg 22 terminates downwardly in a pivot axis 60 and has welded or otherwise secured thereto an upper or top plate 62. The upper plate 62 comprises left and right legs 64, 66, which legs may be provided with suitable openings to facilitate the interconnection of the hydraulic steering means 68 and the locking or manual steering bar 104 in the manner hereinafter more fully set forth. The pivot axis 60 is arranged to pivotally turn within a bearing or other interconnection 72 which is retained within a forward portion of the bottom plate 48. As best seen in FIG. 4, the bottom plate 48 is welded or otherwise securely affixed to the rear support bar 42. It will be appreciated that the bottom plate 48 will always turn as the transverse rear support bar 42 is turned. The upper or top plate 62 will always align directly with the axis of the main frame 10 inasmuch as these parts are permanently secured together.

The rear support bar 42 extends generally at right angles to the axis of the main frame or gooseneck extension hitch 10 and is pivotal about the pivot axis 60 automatically in response to function of the hydraulic steering means 68 or manually in response to manual operation of the locking or manual steering bar 104. Left and right axles 40, 41 extend transversely outwardly from the respective left and right ends 74, 76 of the rear support bar 42 and rotatively carry the rearwardly positioned gooseneck hitch transport wheels 44, 46. A hitch bar 38, which preferably is of conventional configuration, is rearwardly affixed to the rear support bar 42 and comprises a horizontal leg 78 having drilled or otherwise provided therein a plurality of transversely spaced hitch openings 50.

The hydraulic steering means 68 comprises a double acting hydraulic cylinder 80, first and second cylinder heads 82, 84, a piston (not shown) and an extendible and retractable piston rod 92. The first and second heads 82, 84 are equipped to receive conventional hydraulic fittings 86, 88 to connect the respective first and second hydraulic lines 28, 30. As best seen in FIG. 1, the hydraulic lines 28, 30 extend from the cylinder 80 to fittings 90 provided near the trailing end 58 of the main beam 18. Suitable hydraulic piping (not shown) can be provided interiorly of the main beam 18 in known manner to interconnect the flexible rearward extensions of the hydraulic lines 28, 30 with the flexible forward extensions of the hydraulic lines in known manner. It is intended that the flexible forward extensions of the hydraulic lines 28, 30 can be connected to the existing tractor hydraulic couplings (not shown) in known manner to thereby provide cab control of the steering mechanism which rearwardly forms part of the gooseneck extension hitch.

The hydraulic cylinder 80 comprises a double acting piston (not shown) to which the piston rod 92 is connected. As illustrated, the piston rod 92 extends outwardly of the cylinder 80. The end terminus of the piston rod 92 securely affixes to the right end portion 76 of the rear support bar 42 in a sturdy, pivotal interconnection, for example, by employing a bracket 94 and an interconnecting pivot bolt 96.

Accordingly, when the hydraulic controls are functioned to pressurize the left hydraulic line 28 as viewed in FIG. 4 and to cause suction in the right hydraulic line 30, the piston will be urged towards the right to thereby extend the piston rod 92 outwardly of the cylinder 80. Extension of the piston rod 92 will in turn cause clockwise rotation of the rear support bar 42 about the pivot axis 60. Reversal of the operating controls to pressurize the hydraulic line 30 and to create suction forces in the hydraulic line 28 will cause reversal of direction of operation of the piston to thereby retract or withdraw the piston rod 92 within the cylinder 80. The movement of the piston rod 92 to the left as viewed in FIG. 4 will cause counter-clockwise rotation of the rear support bar 42 about the pivot axis 60. In this manner, the direction of travel of the wheels 44, 46 relative to the longitudinal axis of the main beam 18 can be accurately controlled.

As shown, the end of the hydraulic cylinder 80 opposite the piston 92 is pivotally interconnected with the right leg 66 of the top plate 62 through a second pivot bolt 98 in order to provide the required pivotal movement of the rear support bar 42 relative to the main beam 18. Preferably, the geometry of the system is such that the hydraulic steering means 68 will have sufficient adjustability to pivot the rear support bar 42 approximately 35 degrees to the right of the longitudinal axis of the main beam 18 and 35 degrees to the left of the axis of the main beam 18 to provide optimum steering capability.

Figure 3:
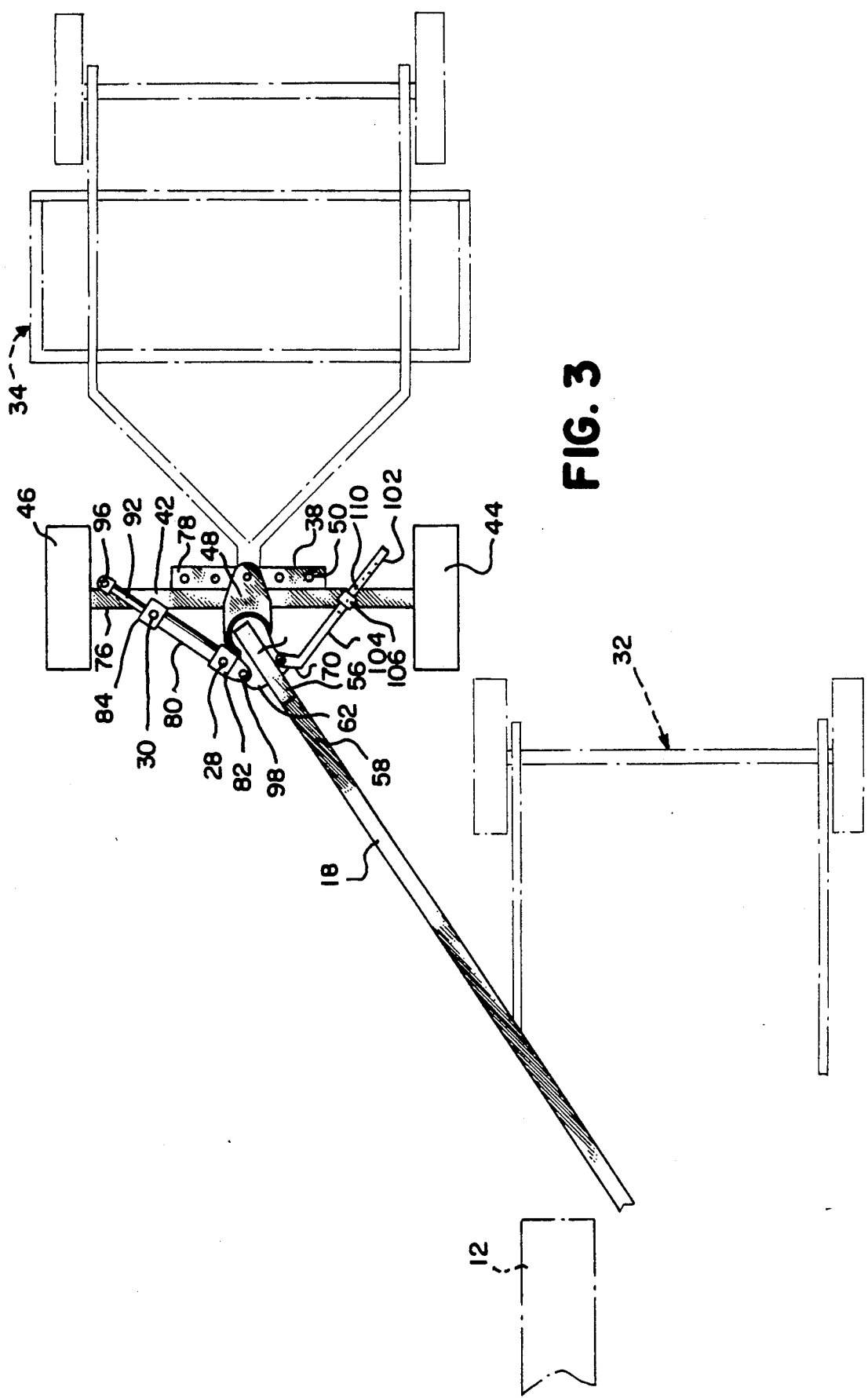
FIG. 3 is a top plan view looking from line 3—3 on FIG. 2 in the direction of the arrows.

If desired, locking or manual steering bar 104 can be interconnected between the left leg 64 of the upper or top plate 62 and the left end portion 74 of the rear support bar 42, as best seen in FIGS. 3 and 4. In those instances wherein the tractor 12 to be used is not provided with a hydraulic coupling, then the locking or manual steering bar 104 can be manually employed to pivot the rear support bar 42 about the pivot axis 60. Once the desired wheel direction has been manually developed, then the rear support bar can be locked in the desired, pivotally selected position by inserting the locking pin 100 into one of the longitudinally spaced adjustment openings 110.

When the apparatus is to be transported over a road system, the rear support bar 42 can be positioned at right angles to the axis of the main beam 18 either manually, or hydraulically and then the selected transport position can be locked by employing the locking pin 100 to secure the adjustment end 102 of the locking or steering bar 104 to the left end portion 74 of the rear support bar 42 by utilizing a suitable pivotal bracket 106. The opposite or pivot end 70 of the locking or steering bar 104 can be pivotally interconnected with the left leg 64 of the top plate 62 by employing a suitable pivot pin or pivot bolt 108. A plurality of longitudinally spaced locking openings 110 are provided along the adjustment end 102 of the locking bar 104 to facilitate easy adjustment and locking of the rear support bar 42 in any desired, angularly offset position.

In order to use the second hayrake hitch of the present invention, the drawbar 14 of the tractor 12 should first be equipped with a ball of conventional design to form a ball and socket connection 16 with the socket provided in the front frame leg 20 of the main frame 10. A first hayrake 32 of conventional design can be secured to the tractor drawbar 14 in usual manner by employing a suitable pin or other connector. The front frame leg 20 is then positioned over the tractor drawbar 14 and the ball and socket connection 16 is completed. The main beam 18 can be positioned to extend above the top of the previously connected first or lead hayrake 32. Alternately, the first hayrake 32 can be pivotally secured to the tractor drawer 14 after the ball and socket connection 16 has been made up. The main frame 10 will then be free to pivot relative to the tractor in a manner to permit right and left movement, up and down movement and any rolling movement as is consistent with such a ball and socket connection 16.

The flexible forward extension of the first and second hydraulic lines 28, 30 are then connected to the hydraulic couplings (not shown) within the tractor 12 to permit remote steering of the gooseneck extension hitch 10 from within the cab of the tractor. The rearward or trailing flexible extensions of the hydraulic lines 28, 30 are connected respectively to the left and right heads 82, 84 of the hydraulic cylinder 80 through usual hydraulic fittings 86, 88 to function the piston (not shown) therewithin in response to hydraulic forces initiated by the tractor operator. A second or trailing hayrake 34 is then connected to the hitch bar 38 which is affixed to the main frame rear support bar 42 at one of the hitch holes 50 by employing a suitable hitch pin or other known type of interconnection.

In use, the trailing hayrake can be automatically positioned to the right of the tractor to rake separate windrows or can be automatically positioned to the left to combine with the windrow of the first or leading hayrake 32 whereby the leading and trailing hayrakes 32, 34 can cooperatively be functioned to form one large windrow. When it is time to transport the apparatus, the hydraulic steering means 68 can hydraulically be centered to cause the entire interconnected apparatus including the main frame 10 and the leading and trailing hayrakes 32, 34 to be moved into longitudinal alignment. Once the rear support bar 42 has been positioned at exactly right angles to the axis of the main beam 18, the locking or manual steering bar 104 can be secured by inserting the locking pin 100 within the proper, aligned adjustment opening 110 to thereby lock the rear support bar 42 in the proper position for ground transport.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only the scope of the claims appended hereto.

What is claimed is:

1. A hayrake hitch for use with a tractor of the type having a drawbar, a first hayrake hitched to the drawbar, and means for supplying hydraulic forces, comprising:
    a main frame means pivotally connected to the tractor, the main frame means comprising an elevated main beam, the main beam having sufficient length and height to pivot laterally relative to the tractor without contacting the first hayrake;
    rear support means pivotally connected to the main frame means,
        the rear support means comprising a rear support bar, left and right wheels rotatably carried by the rear support bar and a rear hitch secured to the rear support bar;
        hydraulic steering means interconnected between a portion of the rear support bar and a portion of the main frame means to pivot the rear support means relative to the main frame means; and,
        hydraulic line means interconnecting the hydraulic steering means and the means for supplying hydraulic forces to permit remote operating control of the hydraulic steering means;
    whereby a second hayrake can be secured to the said rear hitch and whereby the rearward lateral position of the second hayrake relative to the position of the first hayrake can be controlled from the tractor.

2. The hayrake hitch of claim 1 wherein the main beam comprises a front end and a rear end and wherein the main frame means comprises a front frame leg depending downwardly from the front end of the main beam and a rear frame leg depending downwardly from the rear end of the main beam.

3. The hayrake hitch of claim 1 wherein a portion of the hydraulic line means is supported by the main beam.

4. The hayrake hitch of claim 1 wherein the rear support means comprises a bottom plate affixed to the rear support bar.

5. The hayrake hitch of claim 4 wherein the bottom plate is medially positioned on the rear support bar.

6. The hayrake hitch of claim 4 wherein the bottom plate is provided with a pivot opening and wherein a rearward portion of the main frame means is pivotally secured within the pivot opening.

7. They hayrake hitch of claim 6, further comprising an upper plate secured to the main frame means above the said bottom plate, the bottom plate being rotated relative to the upper plate by the said hydraulic steering means.

8. The hayrake hitch of claim 7 wherein the hydraulic steering means comprises a cylinder, a double acting piston within the cylinder, hydraulic line connections to the cylinder to introduce they hydraulic forces into the cylinder in spaced locations to reciprocate the piston in response to the application of hydraulic forces and wherein the hydraulic line means comprises first and second hydraulic lines, the hydraulic lines being respectively connected at the said hydraulic line connections.

9. The hayrake hitch of claim 8 wherein the hydraulic steering means further comprises a piston rod attached to the piston and being reciprocated by the piston, the piston rod comprising an outer end, the outer end being pivotally secured to a portion of the rear support bar.

10. The hayrake hitch of claim 9 wherein the cylinder comprises a piston rod end and a closed end, the closed end of the cylinder being pivotally connected to a portion of the said upper plate.

11. The hayrake hitch of claim 1 and transport safety means interconnected between a portion of the rear support bar and a portion of the main frame means to lock the position of the rear support means relative to the main frame means.

12. The hayrake hitch of claim 11 wherein the transport safety means comprises a locking bar interconnecting the said portion of the rear support bar and the said portion of the main frame means, the locking bar having a first end and a second end, the first end being provided with at least one locking openings.

13. The hayrake hitch of claim 12 and a pivotal connection interconnecting the second end of the locking bar with the said portion of the main frame means.

14. The hayrake hitch of claim 13 wherein the first end of the locking bar is provided with a plurality of longitudinally spaced openings and wherein a bracket is pivotally secured to a portion of the rear support means, the first end of the locking bar being in sliding engagement with the bracket to pivot the bracket when the rear support means is pivoted relative to the main frame means.

15. The hayrake hitch of claim 14 and a locking pin reciprocal within the bracket between an upper, unlocked position and a lower, locked position, the locking pin engaging within one of the said longitudinally spaced opening when in the lower locked position whereby pivotal movement of the rear support means relative to the main frame means will be prevented.

16. The method of simultaneously raking two hay windrows comprising the steps of:
    hitching a first hayrake to the drawbar of a tractor, the tractor comprising means for supplying hydraulic forces;
    forming a main frame of generally U-shaped configuration having a main bar, front and rear depending frame legs and a wheeled rear support bar pivotally connected tot he main frame;
    positioning the main frame over the first hayrake with the front frame leg forwardly of the first hayrake and the second frame leg rearwardly of the first hayrake and pivotally connecting the front frame leg to the tractor;

securing a second hayrake to the main frame rearwardly of the first hayrake and simultaneously pulling the first and second hayrakes with the tractor; and interconnecting a hydraulic cylinder intermediate a portion of the rear support bar and a portion of the rear frame leg, interconnecting hydraulic lines between the hydraulic cylinder and the tractor means for supplying hydraulic forces, and energizing the hydraulic cylinder to rotatively move the rear support bar relative to the main frame while the tractor is moving.

17. The method according to claim 16 and the further step of adjustably interconnecting a locking bar intermediate spaced portions of the rear support bar and the main frame.

* * * * *